Nov. 19, 1963  A. R. FJERMESTAD  3,111,140
MASTER PULSATOR ASSEMBLY FOR MILKING MACHINES
Filed Feb. 6, 1961
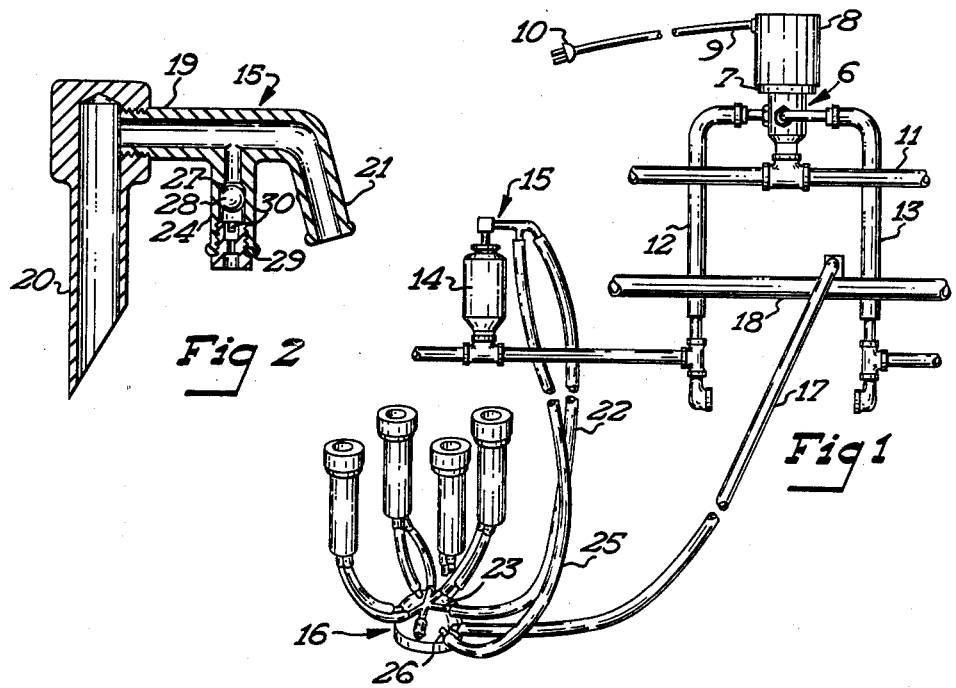
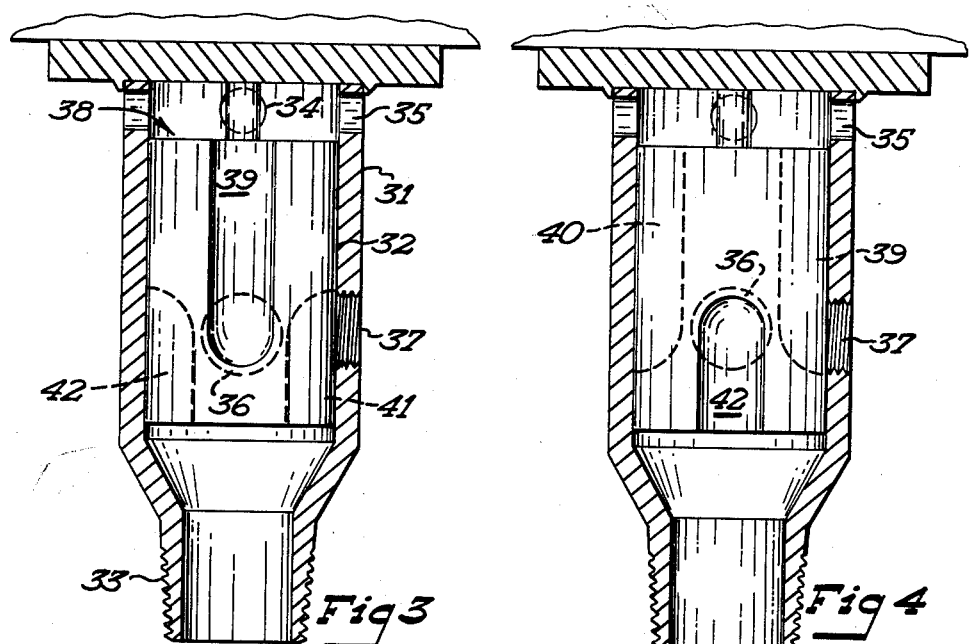
INVENTOR.
ARNOLD R. FJERMESTAD
BY
Everett J. Schroeder
ATTORNEY 3,111,140
MASTER PULSATOR ASSEMBLY FOR
MILKING MACHINES
Arnold R. Fjermestad, Albert Lea, Minn., assignor to
National Cooperatives, Inc., Albert Lea, Minn., a corporation of the District of Columbia
Filed Feb. 6, 1961, Ser. No. 87,146
1 Claim. (Cl. 137—624.13)

This invention relates to milking machines. More particularly, it relates to a master pulsator assembly for use in the operation of a plurality of milking machine claw assemblies.

It is a general object of my invention to provide a novel and improved master pulsator of simple and inexpensive construction and operation.

A more specific object is to provide a novel and improved master pulsator unusually simple to manufacture, service, maintain, and repair and which functions in an improved manner.

Another object is to provide a novel and improved master pulsator which will supply to at least a pair of branch conduits alternately sufficient free air and suction to enable a plurality of claw assemblies to be connected to individual branch conduits without need for an individual pulsator for each claw assembly.

Another object is to provide a novel and improved master pulsator having uniform and positive pulsation with only a single moving part and which is compact and requires a minimum of maintenance.

Another object is to provide a novel and improved master pulsator which has large capacities and can be easily installed for parlor or stanchion barn installations.

Another object is to provide a master pulsator assembly for milking machines which obviates the need for carrying a pulsator from cow to cow with the claw assembly and obviates the need for individual pulsator assemblies for each claw.

Another object is to provide a novel and improved master pulsator which operates with a minimum of noise and has its air intake positioned at the vacuum line level to thereby insure a more sanitary supply of air.

These and other objects and advantages of my invention will more fully appear from the following description, made in connection with the accompanying drawings, wherein like reference characters refer to the same or similar parts throughout the several views, and in which:

FIG. 1 is a fragmentary perspective view of a master pulsator assembly for milking machines embodying my invention.

FIG. 2 is a vertical sectional view through the valved connector utilized in conjunction with my master pulsator.

FIG. 3 is a vertical sectional view on an enlarged scale taken through the longitudinal axis of the valve element of my master pulsator; and FIG. 4 is a vertical sectional view on the same scale with the valve element turned to a position 90 degrees relative to its position in FIG. 3.

One embodiment of my invention is shown in FIG. 1, the master pulsator 6 being driven through a gear reduction mechanism 7 by a motor 8 which is supplied with electricity by an electrical line 9 having a plug 10 at the outer end thereof. As shown the master pulsator 6 is mounted upon the main suction line 11 in fluid communication therewith, the suction pump (not shown) being located at a remote location such as at one end of the barn or exteriorly of the barn. A pair of branch conduits 12 and 13 are connected to the master pulsator 6 and extend away therefrom as shown to various parts of the barn. At various locations along the length of the branch conduits 12 and 13 there is connected a tubular rubber socket 14 as shown at the left in FIG. 1 which through the use of a valved connector 15 may be connected to a claw assembly 16 which in turn is connected by a milk tube 17 to a main milk line 18.

As best shown in FIG. 2 the valved connector 15 is comprised of a rigid conduit 19 having a bevelled end 20 adapted to be inserted in the rubber socket 14 which has a two lipped closure (not shown) at its upper end. The opposite end 21 of the conduit 19 is connected by a tube 22 to the suction T 23 of the claw assembly 16. A branch conduit 24 is connected by an air tube 25 to the air nipple 26 of the claw 16.

Within the branch conduit 24 there is a valve seat 27 and a steel ball 28 which is maintained in close proximity to the valve seat 27 by a tubular retainer screw 29 which is threaded into the free end portion of the branch conduit. As shown in FIG. 2 the upper end of the retainer screw 29 has a slot 30 formed therein which extends transversely across the end of the screw.

The pulsator 6 is comprised of a tubular rigid body 31 having a cylindrical interior 32 and its lower end 33 connected in fluid communication with the main suction line 11. There is a pair of air inlets 34 and 35 formed in the upper end of the body 31 through which the interior of the body is brought into fluid communication with the free atmosphere. These air inlets extend at right angles to each other. A pair of ports 36 and 37 are also provided in the intermediate portion of the body 31 and are disposed so as to extend at 90 degree angles to each other. These ports 36 and 37 are connected to the branch conduits 12 and 13 so as to bring the interior of these conduits in fluid communication with the interior of the tubular body 31 as best shown in FIGS. 3 and 4.

Mounted within the cylindrical interior of the body 31 for rotation about its cylindrical axis is a valve element indicated generally as 38. This valve element is essentially cylindrical in shape and has a solid axial core as shown in FIGS. 3 and 4. Formed in the peripheral surface of the valve element 38 is a plurality of elongated passages which extend axially of the element. A pair of these passages 39 and 40 are diametrically opposed and extend downwardly from the upper end of the valve element 38 to a position opposite the ports 36 and 37. A second pair of diametrically oppositely disposed passages 41 and 42 extend upwardly from the lower end of the valve element 38 to an elevation opposite the upper portions of the ports 36 and 37. As best shown in FIGS. 3 and 4, the pair of passages 39 and 40 and the pair of passages 41 and 42 extend axially past each other so that when the valve element 38 rotates about its cylindrical axis, these ports will be alternately brought into fluid communication with one of the passages 39, 40 and the pair 41 and 42 to alternately connect these ports with a source of suction and the free atmosphere. The result of the rotation of the valve element 38, therefore, is to make the branch conduits 12 and 13 each a source of alternate suction and free air.

As pointed out above, operation of the motor 8 causes the valve element 38 to rotate about its vertical axis and to bring the passages 39, 40 in communication with ports 36 and 37 alternately with the passages 41 and 42. Since free air is always available through the air inlets 34 and 35 to the upper end of the valve element 38 and the passages 39 and 40, whenever either of the passages 39 and 40 is brought into communication with one of the ports 36, 37, free air will pass through that passage and into the branch conduit connected to that port. Similarly, when either of the two passages 41, 42 is brought into position opposite one of the ports 36 and 37, that port will be subjected to suction of approximately 15 inches which is the conventional amount of suction normally provided by the suction pump via the suction line 11. The free air and suction is therefore alternately submitted to the valve connector 15 from whence the suction is communicated to the suction T 23 by way of the suction tube 22. Suction upon the valve connector 15, however, will cause the steel ball 28 to be sucked upwardly against the valve seat 27 and preclude suction from being applied to the milk line via the tube 25. On the other hand, when air is provided to the valve connector 15, the supply of air will permit the ball 28 to drop downwardly by action of gravity upon the slotted retainer screw 29 and permit air to pass through the slot 30 into the air tube 25 and thence into the interior of the claw 16 to thereby provide air to facilitate the movement of milk upwardly through the milk tube 17. Thus a full supply of free air is provided to facilitate movement of the milk upwardly through the milk tube and the suction upon the teat itself is reduced during the teat massaging operation of the milking action. By using a master pulsator in combination with the valve connector as shown, I eliminate the tendency toward teat washing and the back flow of milk in the milk line and also tend to eliminate rancidity in the milk by causing less churning action to take place within the milk line. It will be noted that through the use of this equipment there is no problem involved in supplying air into the flow of milk through the milk line 17 as has heretofore been experienced when individual pulsators are utilized, the reason being that the air is introduced through the use of my equipment only after the milking operation upon the teat has been completed and is completely shut off while the suction is applied to the teat to induce the flow of milk therefrom. Thus, I provide an ample supply of free air to more efficiently move the milk through the milk tube 17 without danger of losing the head of suction required during the milking operation whereas in assemblies where air is continuously introduced, the amount of air which is introduced must necessarily be limited else the required head of suction cannot be maintained.

One advantage, of course, of the mechanical drive for my master pulsator is that the pulsation cycle is constant and positive regardless of temperature changes. Master pulsators which inherently utilize a piston assembly are extremely difficult to operate in such a manner as to provide a constant and positive pulsation cycle. Since the pulsation cycle is constant and positive, we obtain more efficient milking for such a characteristic of the pulsation cycle contributes definitely toward the most efficient milking. In addition, my master pulsator requires less maintenance and repair since it has only one moving part. It will be noted that through the use of my equipment I have eliminated the need for a separate pulsator for each individual claw assembly and therefore, there is less equipment to be carried from cow to cow and there is a substantially less cash outlay or capital investment to be made for the original equipment. My pulsator operates with substantially less noise than the type which utilizes a piston and it provides an automatic and timed injection of air into the system to aid in moving the flow of milk to the main milk line. As pointed out above this provides more efficient milking and eliminates rancidity in the milk while eliminating teat washing and a back flow of milk in the system.

Another advantage of this equipment is that it precludes tampering by the individual milking operators to vary the speed of the milking operation with deleterious effects upon the animal. My master pulsator necessarily operates at the same cycle without any possible variation or modification by the user. It eliminates the changes which take place in the cycle of the pneumatic system wherein lubrication and temperature changes cause the speed of the pulsator to vary and thereby destroy the uniformity of the speed of operation. Since a very important essential of optimum milking conditions is the provision of a uniform predetermined speed, it is important to provide, if possible a pulsator which has these characteristics.

In addition to the above, my pulsator is simple to construct or manufacture and relatively inexpensive. It has an increased capacity and reduced maintenance in addition to providing increased efficiency.

It will, of course, be understood that various changes may be in the form, details, arrangement and proportions of the parts without departing from the scope of my invention which consists of the matter shown and described herein and set forth in the appended claim.

What is claimed is:

Milking apparatus comprising a source of suction, a substantially closed body having a cylindrically shaped hollow interior, said body having an exteriorly threaded tubular lower end portion extending axially of the cylinder and threadedly connected with the source of suction and bringing the interior of said body into constant fluid communication with said source of suction, closure means closing the upper end of said body, said body having an atmospheric inlet at its upper end bringing the upper end portion of its interior into constant communication with free air, a generally cylindrically shaped valve element having a solid axial core disposed within said hollow interior of said body in close-fitting relation with the inner wall surface thereof and being disposed between said air inlet and said threaded lower end portion, said body having a port disposed in a transverse plane axially spaced between said air inlet and said lower end portion of said body, said valve element having a pair of diametrically opposed elongated air passages formed in only the periphery of said valve element and extending downwardly from the upper end of said valve element to a position opposite said port and being in constant fluid communication with said atmospheric inlet, said valve element having a pair of diametrically opposed elongated suction passages formed in only the periphery of said valve element and extending upwardly from the lower end of said valve element to a position opposite said port, said pair of suction passages being spaced 90° circumferentially of said valve element relative to said air passages, said interior of said body being of generally uniform diameter and said valve element being of the same and generally uniform diameter, said closure means cooperatively defining with the upper end of said valve element an air chamber in constant fluid communication with said air inlet and said air passages of said valve element, rotary mechanized means connected to said valve element and rotating the same about its longitudinal axis in position between said air inlet and said lower end portion of said body, said valve element and its connection with said rotary means constituting the only structure within said body, and conduit means for operatively connecting said port with a claw assembly.

References Cited in the file of this patent

UNITED STATES PATENTS

| | | |
|---|---|---|
| 1,546,579 | Hammond | July 21, 1925 |
| 1,949,875 | Persoons | Mar. 6, 1934 |
| 2,980,138 | Detweiler | Apr. 18, 1961 |